US012577636B2

(12) United States Patent
Miyazaki et al.

(10) Patent No.: US 12,577,636 B2
(45) Date of Patent: Mar. 17, 2026

(54) METHOD FOR SEPARATING COBALT AND NICKEL

(71) Applicant: MITSUBISHI MATERIALS CORPORATION, Tokyo (JP)

(72) Inventors: Atsushi Miyazaki, Iwaki (JP); Hiroki Muraoka, Iwaki (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 427 days.

(21) Appl. No.: 18/023,050

(22) PCT Filed: Aug. 31, 2021

(86) PCT No.: PCT/JP2021/031833
§ 371 (c)(1),
(2) Date: Feb. 24, 2023

(87) PCT Pub. No.: WO2022/050248
PCT Pub. Date: Mar. 10, 2022

(65) Prior Publication Data
US 2023/0313337 A1    Oct. 5, 2023

(30) Foreign Application Priority Data

Sep. 3, 2020    (JP) ................................. 2020-148388
Aug. 26, 2021    (JP) ................................. 2021-138132

(51) Int. Cl.
*C22B 3/00*        (2006.01)
*C22B 3/22*        (2006.01)
(Continued)

(52) U.S. Cl.
CPC .............. *C22B 23/043* (2013.01); *C22B 3/22* (2013.01); *C22B 3/408* (2021.05); *C22B 3/44* (2013.01);
(Continued)

(58) Field of Classification Search
CPC ......... C22B 23/043; C22B 3/22; C22B 3/408; C22B 3/44; C22B 7/007; C22B 23/005;
(Continued)

(56) References Cited

U.S. PATENT DOCUMENTS

2019/0152797 A1    5/2019  Liu et al.
2021/0180154 A1*   6/2021  Takenouchi ............ C22B 7/007

FOREIGN PATENT DOCUMENTS

CN        102492858 A       6/2012
CN        111418110 A       7/2020
(Continued)

OTHER PUBLICATIONS

JP2011074406A Translation (Year: 2011).*
(Continued)

*Primary Examiner* — Danielle M. Carda
(74) *Attorney, Agent, or Firm* — Troutman Pepper Locke LLP; James E. Armstrong, IV; Nicholas J. DiCeglie, Jr.

(57) ABSTRACT

What is provided is a method for separating cobalt and nickel including: a crushing and sorting step of crushing and classifying the lithium ion secondary battery to obtain an electrode material containing at least cobalt, nickel, copper, and lithium; a leaching step of immersing the electrode material in a processing liquid containing sulfuric acid and hydrogen peroxide to obtain a leachate; a copper separation step of adding a hydrogen sulfide compound to the leachate with stirring and subsequently carrying out solid-liquid separation to obtain an eluate containing cobalt and nickel and a residue containing copper sulfide; and a cobalt/nickel separation step of adding an alkali metal hydroxide to the eluate to adjust a pH and subsequently, adding a hydrogen sulfide compound with stirring and carrying out solid-liquid separation to obtain a precipitate containing cobalt sulfide and nickel sulfide and a residual liquid containing lithium.

10 Claims, 1 Drawing Sheet

(51) Int. Cl.

| | |
|---|---|
| *C22B 3/40* | (2006.01) |
| *C22B 3/44* | (2006.01) |
| *C22B 7/00* | (2006.01) |
| *C22B 23/00* | (2006.01) |
| *H01M 10/54* | (2006.01) |

(52) U.S. Cl.
CPC ............ *C22B 7/007* (2013.01); *C22B 23/005* (2013.01); *C22B 23/0469* (2013.01); *H01M 10/54* (2013.01)

(58) Field of Classification Search
CPC ..... C22B 23/0469; C22B 26/12; C22B 47/00; C22B 23/0461; C22B 7/005; C22B 3/08; C22B 23/0484; C22B 3/3844; C22B 7/006; C22B 15/0063; C22B 23/0476; Y02P 10/20; Y02W 30/84; H01M 10/54; H01M 10/0525; H01M 4/525; B01D 9/0054; B01D 11/0257; B01D 11/0288; B01D 11/0284; B01D 11/028; B01D 11/0492; C01G 3/12; C01G 51/15; C01G 53/11; B09B 3/40; B09B 3/80; B09B 2101/16; B09B 3/70
USPC .......................................................... 75/743
See application file for complete search history.

(56) References Cited

FOREIGN PATENT DOCUMENTS

| | | | | | |
|---|---|---|---|---|---|
| JP | 2011074406 | A | * | 4/2011 | |
| JP | 2015183292 | A | * | 10/2015 | |
| JP | 2016-113672 | A | | 6/2016 | |
| JP | 2016-186118 | A | | 10/2016 | |
| JP | 2017-036489 | A | | 2/2017 | |
| JP | 2017-036490 | A | | 2/2017 | |
| JP | 2019-077912 | A | | 5/2019 | |
| JP | 2019-081915 | A | | 5/2019 | |
| JP | 2019108586 | A | * | 7/2019 | ............... B09B 3/40 |
| JP | 2020-522622 | A | | 7/2020 | |
| WO | 2018/223193 | A1 | | 12/2018 | |
| WO | WO-2019060996 | A1 | * | 4/2019 | ............. C22B 26/12 |

OTHER PUBLICATIONS

JP2015183292A Translation (Year: 2015).*
Office Action mailed Oct. 26, 2024, issued for CN202180053662.3 and English translation thereof.
International Search Report mailed Oct. 5, 2021, issued for PCT/JP2021/031833 and English translation thereof.
Office Action mailed May 10, 2022, issued for Japanese Patent Application No. 2021-138132 and English translation thereof.
Search Report issued in European Patent Application No. EP 21864306.2, mailed Jul. 25, 2025.

* cited by examiner

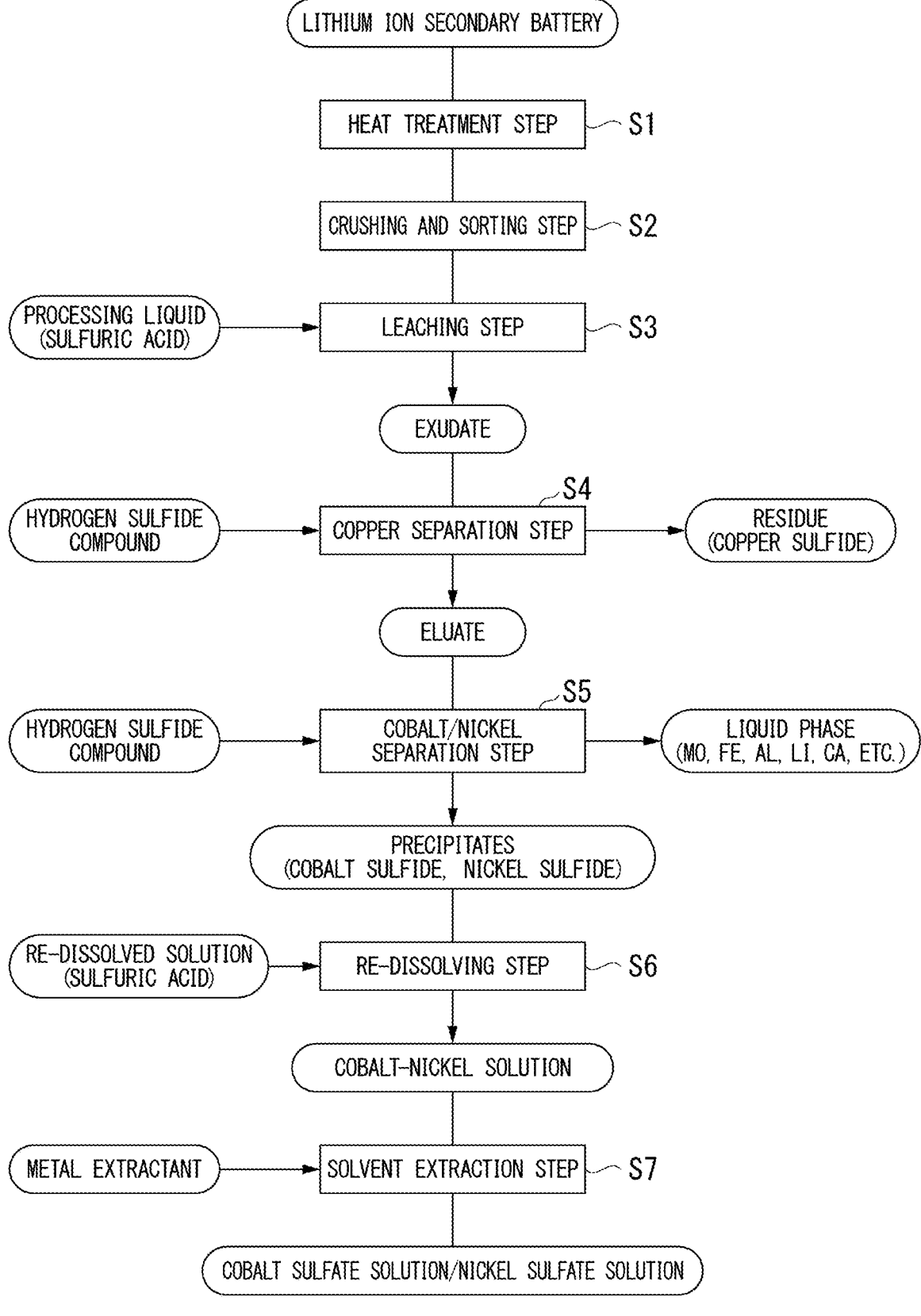

METHOD FOR SEPARATING COBALT AND NICKEL

TECHNICAL FIELD

The present invention relates to a method for separating cobalt and nickel, which enables accurate separation and recovery of cobalt and nickel contained in a lithium ion secondary battery from other metals.

Priority is claimed on Japanese Patent Application No. 2020-148388, filed Sep. 3, 2020, and Japanese Patent Application No. 2021-138132, filed Aug. 26, 2021, the contents of which are incorporated herein by reference.

BACKGROUND ART

Lithium ion secondary batteries are used as power sources in a wide rang e of fields, from small power sources for various electronic devices and the like to large power sources for electric vehicles and the like. In a case where such lithium ion secondary batteries are discarded, it is required to recover and reuse useful metals.

A lithium ion secondary battery is formed by fractionating a negative electrode material and a positive electrode material with a separator such as porous polypropylene, stacking them in a layer shape, and enclosing them together with an electrolyte such as lithium hexafluorophosphate ($LiPF_6$) and an electrolytic solution in a case made of aluminum, stainless steel, or the like.

A negative electrode material of a lithium ion secondary battery is formed by applying a negative electrode active material such as graphite mixed with a binder onto a negative electrode current collector consisting of a copper foil or the like. In addition, a positive electrode material is formed by applying a positive electrode active material such as lithium manganate, lithium cobalt oxide, lithium nickel oxide, or the like, mixed with a binder, onto a positive current collector consisting of an aluminum foil or the like.

As described above, the positive electrode active material of the lithium ion secondary battery contains a large amount of cobalt and nickel. However, A positive electrode active material crushed and separated in advance in the recycling process contains manganese, copper, aluminum, lithium, and the like, in addition to cobalt and nickel. Therefore, in order to separate and recover cobalt and nickel from the lithium ion secondary battery with a high yield, it is necessary to accurately remove metals other than these.

Conventionally, regarding a method for separating and recovering cobalt and nickel contained in a lithium ion secondary battery, for example, Patent Documents 1 and 2 disclose, as a method for recovering valuable metals from a used lithium ion secondary battery, a recovery method in which a positive electrode active material is taken out from a lithium ion secondary battery, a leachate in which metals are leached from the positive electrode active material is obtained by acid leaching, and cobalt and nickel are separated from the leachate by solvent extraction.

CITATION LIST

Patent Documents

[Patent Document 1]
Japanese Unexamined Patent Application, First Publication No. 2016-113672 (A)

[Patent Document 2]
Japanese Unexamined Patent Application, First Publication No. 2016-186118 (A)

SUMMARY OF INVENTION

Technical Problem

In the recovery methods disclosed in Patent Documents 1 and 2, as a method for removing impurity elements, an oxidizing agent is added or pH is adjusted to form precipitates containing a hydroxide, whereby solid-liquid separation is carried out. However, since cobalt and nickel and other metals (copper, aluminum, manganese, iron, and the like) are removed at the same time, cobalt and nickel are required to be separated from other metals in a plurality of subsequent steps, and thus there is a problem that the separation step is complicated and troublesome, and the cost of recovering cobalt and nickel is high.

The present invention has been made in consideration of the above-described circumstances, and an object of the present invention is to provide a method for separating cobalt and nickel, which makes it possible to separate cobalt and nickel contained in a lithium ion secondary battery from other metals with high accuracy in a small number of steps and recover cobalt and nickel from the lithium ion secondary battery at low cost.

Solution to Problem

In order to solve the above problems, the method for separating cobalt and nickel according to an aspect of the present invention (hereinafter, referred to as "the method for separating cobalt and nickel according to the present invention") is a method for separating cobalt and nickel, in which cobalt and nickel are separated from a lithium ion secondary battery, the method including: a crushing and sorting step of crushing and classifying the lithium ion secondary battery to obtain an electrode material containing at least cobalt, nickel, copper, and lithium; a leaching step of immersing the electrode material in a processing liquid containing sulfuric acid and hydrogen peroxide to obtain a leachate; a copper separation step of adding a hydrogen sulfide compound to the leachate with stirring and subsequently carrying out solid-liquid separation to obtain an eluate containing cobalt and nickel and a residue containing copper sulfide; and a cobalt/nickel separation step of adding an alkali metal hydroxide to the eluate to adjust a pH and subsequently, adding a hydrogen sulfide compound with stirring and carrying out solid-liquid separation to obtain a precipitate containing cobalt sulfide and nickel sulfide and a residual liquid containing lithium.

According to the method for separating cobalt and nickel related to the present invention, metal components are eluted from an electrode material with a processing liquid containing sulfuric acid and hydrogen peroxide, and a water-soluble hydrogen sulfide compound is added to the obtained leachate with stirring to selectively precipitate and separate only copper, as an insoluble sulfide, among the metal components contained in the leachate. Then, after adjusting the pH, since a water-soluble hydrogen sulfide compound is added with stirring to selectively precipitate only cobalt and nickel, as insoluble sulfides, among the metal components contained in the eluate, it is possible to separate cobalt and nickel from a lithium ion secondary battery with high accuracy in a small number of steps.

In addition, the method for separating cobalt and nickel according to the present invention may include, before the crushing and sorting step, a heat treatment step of heating the lithium ion secondary battery to carry out a heat treatment.

Further, it may include a re-dissolving step of adding, with stirring, a re-dissolved solution containing sulfuric acid to the precipitate separated in the cobalt/nickel separation step and subsequently carrying out solid-liquid separation to obtain a cobalt-nickel solution containing cobalt and nickel; and a solvent extraction step of adding an extractant solution to the cobalt-nickel solution to obtain a cobalt extract and a nickel extract.

In addition, in the re-dissolved solution in the method for separating cobalt and nickel according to the present invention, in the re-dissolving step, an immersion time of the precipitate in the re-dissolved solution may be 1 hour or more.

In addition, in the leaching step in the method for separating cobalt and nickel according to the present invention, the processing liquid may have a liquid temperature of 60° C. or higher and a sulfuric acid concentration of 2 mol/L or more.

In addition, in the copper separation step in the method for separating cobalt and nickel according to the present invention, in the copper separation step, a pH of the leachate may be maintained at 1.0 or less from start to end of the addition of the hydrogen sulfide compound, and an aqueous solution of sodium hydrogen sulfide may be added as the hydrogen sulfide compound until an oxidation-reduction potential (vs Ag/AgCl) is 0 mV or less.

In addition, in the cobalt/nickel separation step in the method for separating cobalt and nickel according to the present invention, in the cobalt/nickel separation step, an aqueous solution of sodium hydrogen sulfide may be used as the hydrogen sulfide compound, a pH of the eluate may be maintained within a range of 2.0 to 5.0 from start to end of the addition of the hydrogen sulfide compound, and the hydrogen sulfide compound may be added to the eluate until an oxidation-reduction potential (vs Ag/AgCl) is −400 mV or less.

In addition, in the present invention, the pH of the eluate may be maintained within a range of 2.0 to 3.5 from the start to the end of the addition of the hydrogen sulfide compound.

In addition, in the pH adjustment in the cobalt/nickel separation step in the method for separating cobalt and nickel according to the present invention, a pH of the eluate may be adjusted within a range of 3.0 to 4.0.

In addition, in the re-dissolving step, the precipitate may be dissolved with a re-dissolved solution containing sulfuric acid and hydrogen peroxide water, or the precipitate may be added to the re-dissolved solution containing sulfuric acid and subsequently subjected to air bubbling to dissolve the precipitate.

In addition, in the re-dissolving step in the method for separating cobalt and nickel according to the present invention, the re-dissolved solution may have a liquid temperature of 60° C. or higher and a sulfuric acid concentration of 0.5 mol/L or more.

In addition, the method for separating cobalt and nickel according to the present invention may include, as a pre-step of the crushing and sorting step, a heat treatment step of heating the lithium ion secondary battery to carry out a heat treatment.

Advantageous Effects of Invention

According to the present invention, it is possible to provide a method for separating cobalt and nickel, which makes it possible to separate cobalt and nickel contained in a lithium ion secondary battery from other metals with high accuracy in a small number of steps and recover cobalt and nickel from the lithium ion secondary battery at low cost.

BRIEF DESCRIPTION OF DRAWINGS

FIG. 1 is a flow chart stepwise showing a method for recycling an electrode material of a lithium ion secondary battery, including a method for separating cobalt and nickel according to the present invention.

DESCRIPTION OF EMBODIMENTS

Hereinafter, a method for separating cobalt and nickel according to an embodiment of the present invention will be described with reference to the drawing. Each embodiment to be described below is specifically described for a better understanding of the gist of the invention and does not limit the present invention unless otherwise specified.

FIG. 1 is a flow chart stepwise showing a method for recycling an electrode material of a lithium ion secondary battery, including a method for separating cobalt and nickel according to the present invention.

(Heat Treatment Step S1)

As a pretreatment step of separating an electrode material that constitutes a discarded lithium ion secondary battery (hereinafter referred to as a discarded LIB), the discarded LIB is heated in a heating furnace to about 500° C. for example, with superheated steam to carry out a heat treatment.

The heat treatment may be carried out under vacuum or normal pressure; however, it is preferably carried out by carrying out heating in an oxygen-free inert atmosphere. Due to the presence of a binder and an electrolytic solution, the discarded LIB has a strong adhesive force between a positive electrode active material or negative electrode active material and an aluminum foil or copper foil which is a current collector. Therefore, in a case of carrying out the heat treatment step at 400° C. or higher, the separation between the active material and the current collector is facilitated. In a case of setting the heating temperature of the discarded LIB to 650° C. or lower, it is possible to prevent difficulty in taking out only the active material, which is caused by aluminum being melted and then cooled and solidified while entangling the active material.

(Crushing and Sorting Step S2)

Next, after crushing the discarded LIB after the heat treatment, the electrode material is sorted and separated by sieving. The discarded LIB is crushed by using, for example, a twin-shaft shear crusher or a hammer mill.

Then, the crushed discarded LIB is classified by using a sieve having a suitable mesh size, and then, a battery container, an aluminum foil, a copper foil, and a nickel terminal are recovered as upper-side products of the sieve, and electrode materials containing the positive electrode active material ($LiCoO_2$ or the Woe) and the negative electrode active material (graphite) are recovered as a lower-side product of the sieve. It suffices that such electrode materials are those that have passed through a sieve having, for example, a mesh size of about 0.5 mm.

The separated electrode materials mainly contain cobalt, nickel, manganese, copper, iron, aluminum, lithium, calcium, and the like, which are constitutional materials and impurities of the positive electrode active material, and carbon which is a constitutional material of the negative electrode active material.

(Leaching Step S3)

Next, the electrode materials separated in the crushing and sorting step S2 are immersed in a processing liquid to obtain a leachate. As the processing liquid, a processing liquid obtained by mixing sulfuric acid ($H_2SO_4$) and hydrogen peroxide (1202) is used.

Co and Ni contained in the discarded LIB include those in trivalent and tetravalent states, which are difficult to be dissolved in sulfuric acid, and thus in a case of using hydrogen peroxide as a reducing agent, Co and Ni can be reduced to divalent Co and Ni, which are more easily dissolved in the sulfuric acid.

Examples of the processing liquid include a processing liquid obtained by carrying out mixing at a ratio of 5 ml or more of hydrogen peroxide water having a concentration of 30 wt % to 100 ml of dilute sulfuric acid having a concentration of 2 mol/L or more. In a case of setting the concentration of the dilute sulfuric acid to 2 mol/L or more and the adding amount of the hydrogen peroxide water to 5 ml or more, the leaching rate of cobalt and nickel can be increased. Although there is no particular limitation, the leaching rate cannot be expected to be further increased even in a case where the concentrations are further increased, and thus the upper limit of the concentration of sulfuric acid is 18 mol/L, and the upper limit of the adding amount of hydrogen peroxide water is 30 ml.

As a specific example of the leaching step S3, for example, the powdery electrode materials separated in the crushing and sorting step S2 are added to a processing liquid heated to 60° C. or higher and immersed for 4 hours or more. At this time, it is preferable to carry out stirring.

In a case of setting the temperature of the processing liquid to 60° C. or higher and the leaching (immersion) time to 4 hours or more, the leaching rate of cobalt and nickel can be increased. Although there is no particular limitation, the leaching rate cannot be expected to be further increased even in a case where the concentrations are further increased, and thus the upper limit of the temperature of the processing liquid is 90° C., and the upper limit of the leaching time is 15 hours.

By such a leaching step S3, among the electrode materials, the metal components derived from the positive electrode active material (cobalt, nickel, manganese, copper, iron, aluminum, lithium, calcium, and the like) are dissolved in the processing liquid, and the carbon derived from the negative electrode active material is not dissolved and remains as a carbon residue.

(Copper Separation Step S4)

Next, a hydrogen sulfide compound is added with stirring to the leachate obtained in the leaching step S3, and subsequently, solid-liquid separation is carried out to obtain an dilate containing cobalt and nickel and a residue containing copper sulfide (CuS).

In the method for separating cobalt and nickel according to the present invention, the hydrogen sulfide compound means a compound containing a sulfur fraction, where the sulfur fraction has a form of $H_2S$, $HS^-$, or $S^{2-}$ in a case of being dissolved in water.

As the hydrogen sulfide compound that is used in the copper separation step S4, a hydride of a water-soluble alkali metal sulfide, that is, an aqueous solution of sodium hydrogen sulfide (NaSH) in the present embodiment is used. As a specific example of the copper separation step S4, after diluting the leachate with ion exchange water, an aqueous solution of sodium hydrogen sulfide is added to the diluted leachate with stirring.

The addition of the aqueous solution of sodium hydrogen sulfide is carried out, for example, until the oxidation-reduction potential (vs Ag/AgCl) is 0 mV or less. In a case of adding the sodium hydrogen sulfide until the oxidation-reduction potential is 0 mV or less, it is possible to precipitate almost the entire amount of copper contained in the leachate.

It is preferable that the pH of the leachate is maintained at 1.0 or less from the start to the end of the addition of the hydrogen sulfide compound. In a case where the pH of the leachate exceeds 1.0, there is a risk that sulfides of cobalt and nickel are generated and thus the recovery rate of these sulfides in the eluate decreases.

In addition to sodium hydrogen sulfide, the hydrogen sulfide compound may be sodium sulfide, sodium thiosulfate, or sodium dithionite.

By adding a hydrogen sulfide compound to the leachate, copper and sulfur among the metal components dissolved in the leachate react with each other to generate copper sulfide (CAS), which is subsequently precipitated. On the other hand, metal components (cobalt, nickel, manganese, iron, aluminum, lithium, calcium, and the like) excluding copper remain in the liquid phase, whereby an eluate containing cobalt and nickel is obtained.

Thereafter, solid-liquid separation is carried out using a filtering medium or the like, whereby the solid phase consisting of the carbon residue generated in the leaching step S3 and the residue generated in the copper separation step S4, and the eluate (the liquid phase) are separated.

In the present embodiment, although the carbon residue generated in the leaching step S3 is also filtered out by the solid-liquid separation in the copper separation step S4, it is also possible to carry out the solid-liquid separation in the leaching step S3 as well to separate the carbon residue in advance before carrying out the copper separation step S4.

In addition, in the copper separation step S4, sodium hydroxide (NaOH) is used to adjust the pH of the leachate to about 3.0 to 4.0 before the solid-liquid separation, and the aluminum contained in the leachate is precipitated as aluminum hydroxide ($Al(OH)_3$), thereby also being capable of being separated from the leachate by solid-liquid separation, together with the carbon residue and the residue.

The separated solid phase may be repulped (resuspended by adding water to the solid phase and then purified by carrying out dehydration) and then treated as waste.

(Cobalt/Nickel Separation Step S5)

Next, an alkali metal hydroxide is added to the eluate to adjust the pH and subsequently, a hydrogen sulfide compound is added with stirring, and solid-liquid separation is carried out to obtain a precipitate containing cobalt sulfide and nickel sulfide and a residual liquid containing lithium.

Examples of the alkali metal hydroxide for adjusting the pH of the eluate at the initial stage of the cobalt/nickel separation step S5 include sodium hydroxide (NaOH) and potassium hydroxide (KOH). In the present embodiment, an aqueous solution of 25 wt % sodium hydroxide is used.

Such pH adjustment makes the pH of the eluate be in a range of 3.0 to 4.0, for example, 3.5.

At this time, in a case where the pH of the eluate is low, there is a risk that the reaction between the hydrogen sulfide compound and cobalt or nickel is difficult to occur. However, as the hydrogen sulfide compound is added, the pH of the eluate decreases. In a case where the pH at the start of the addition of the hydrogen sulfide compound after the pH adjustment is less than 3.0, the pH excessively decreases before the addition of the hydrogen sulfide compound is completed, which results in the requirement of another pH adjustment. As a result, it is efficient to adjust the pH to 3.0 or more at the time of the pH adjustment, which is a pretreatment for sulfidation.

In addition, it takes a long time to adjust the pH in a case where the pH is adjusted to a value exceeding 4.0; however, the addition of the hydrogen sulfide compound immediately decreases the pH to 4.0 or less, which is inefficient. As a result, a range of 3.0 to 4.0 is desirable as the pH adjustment range.

Then, in a case of adding a water-soluble hydrogen sulfide compound to the eluate after pH adjustment, cobalt and nickel contained in the eluate each become water-insoluble cobalt sulfide (CoS) and nickel sulfide (NiS), thereby being precipitated.

Examples of the hydrogen sulfide compound for sulfurizing cobalt and nickel include a hydride of a water-soluble alkali metal sulfide. The hydrogen sulfide compound may be the same or different from that used in the copper separation step S4. In the present embodiment, an aqueous solution of sodium hydrogen sulfide having a concentration of 250 g/L is used.

The addition of the aqueous solution of sodium hydrogen sulfide is carried out, for example, until the oxidation-reduction potential (vs Ag/AgCl) is −400 mV or less. In a case of adding the sodium hydrogen sulfide until the oxidation-reduction potential is −400 mV or less, it is possible to precipitate almost the entire amounts of cobalt and nickel contained in the eluate.

It is preferable that the pH of the leachate is maintained within a range of 2.0 to 5.0 and preferably 2.0 to 3.5 from the start to the end of the addition of the hydrogen sulfide compound. In a case where the pH of the leachate is less than 2.0, a reaction between sodium hydrogen sulfide and sulfuric acid (NaSH+H$_2$SO$_4$→H$_2$S+Na$_2$SO$_4$) occurs, and the sulfidation of cobalt and nickel is difficult to proceed since sodium hydrogen sulfide is consumed. On the other hand, in a case where the pH of the leachate exceeds 5.0, there is a risk that hydroxides of other metals are generated, and thus the purity of the precipitates decreases. In addition, it is difficult to control the pH in the high range.

It is noted that the cobalt sulfide referred here may include cobalt sulfide compounds of various compositions, such as cobalt sulfide (II), cobalt disulfide (CoS$_2$), and nonacobalt octasulfide (Co$_9$S$_8$). Similarly, the nickel sulfide (NiS) may include nickel sulfide compounds of various compositions, such as nickel sulfide (U), nickel disulfide (NiS$_2$), trinickel tetrasulfide (Ni$_3$S$_4$), and trinickel disulfide (Ni$_3$S$_2$).

On the other hand, metal components (manganese, iron, aluminum, lithium, calcium, and the like) excluding cobalt and nickel remain in the liquid phase (the residual liquid) after the addition of the hydrogen sulfide compound. Manganese, iron, aluminum, lithium, calcium, and the like contained in the liquid phase obtained here can be separated and recovered by solvent extraction or the like by pH adjustment.

(Re-Dissolving Step S6)

Next, a re-dissolved solution containing sulfuric acid is added with stirring to the precipitates obtained in the cobalt/nickel separation step S5, and subsequently, solid-liquid separation is carried out to obtain a cobalt-nickel solution containing cobalt and nickel.

As the re-dissolved solution, for example, a re-dissolved solution obtained by mixing sulfuric acid and hydrogen peroxide as an oxidizing agent is used. An example of the re-dissolved solution includes a re-dissolved solution obtained by carrying out mixing at a ratio of 20 ml of hydrogen peroxide water having a concentration of 30 wt % to 100 ml of dilute sulfuric acid having a concentration of 1.5 mol/L.

As a specific example of the re-dissolving step S6, for example, the precipitates are added to a re-dissolved solution heated to 60° C. or higher and immersed for 4 hours or more. At this time, it is preferable to carry out stirring. Alternatively, air bubbling can also be carried out in a case where the precipitates are immersed without adding the hydrogen peroxide water to the re-dissolved solution.

At this time, in a case of setting the temperature of the processing liquid to 60° C. or higher and the leaching time to 1 hour or more, the dissolution rate of cobalt and nickel can be increased. Although there is no particular limitation, the dissolution rate cannot be expected to be further increased even in a case where the concentrations are further increased, and thus the upper limit of the temperature of the processing liquid is 90° C., and the upper limit of the leaching time is 15 hours.

The treatment of the precipitates using such a re-dissolved solution dissolves the cobalt and the nickel in the re-dissolved solution. In addition, impurities that are not dissolved in the re-dissolved solution, elemental sulfur generated in the cobalt/nickel separation step S5, and the like remain as solid phases. Thereafter, solid-liquid separation is carried out using a filtering medium or the like to obtain a cobalt-nickel solution in which the purity of cobalt and nickel is increased (purified).

The cobalt-nickel solution obtained in this way rarely contains other components (copper, iron, aluminum, lithium, calcium, and the like) of the electrode material other than cobalt and nickel, and thus the cobalt-nickel solution is suitable as a high-purity recovered raw material of cobalt and nickel.

It is noted that it is also preferable to remove impurities other than the cobalt sulfide and the nickel sulfide by repulping the precipitates as a pre-step of the re-dissolving step S6.

In the copper separation step S4, the procedure for removing aluminum before carrying out solid-liquid separation has been described above. However, in a case where such a procedure is not carried out, the precipitates may contain an aluminum compound. In this case, the aluminum compound can be removed by repulping the precipitates.

(Solvent Extraction Step S7)

Next, an extractant solution is added to the cobalt-nickel solution obtained in the re-dissolving step S6 to obtain a cobalt extract and a nickel extract.

As the extractant solution, it is possible to use a mixed solution obtained by mixing a metal extractant and a diluent. For example, it is possible to use a mixed solution obtained by carrying out mixing at a ratio of 20 vol % 2-ethylhexyl 2-ethylhexyl phosphonate (PC88A: manufactured by DAI-HACHI CHEMICAL INDUSTRY Co., Ltd.) to 80 vol % kerosene (a diluent).

Using the extractant solution described above, a cobalt sulfate (CoSO$_4$) solution and a nickel sulfate (NiSO$_4$) solution are separated and recovered from the cobalt-nickel solution by a mixer-settler.

Cobalt and nickel can be recovered from the discarded LIB at a high yield by the above steps. For example, in a case assuming that the amounts of cobalt and nickel in the electrode material taken out from the discarded LIB are each 100%, cobalt and nickel can be recovered at a high yield of 95% or more by the method for separating cobalt and nickel according to the present embodiment.

Although the embodiments according to the present invention have been described above, the embodiments are presented as examples and thus are not intended to limit the scope of the invention. These embodiments can be implemented in various other forms, and various omissions, replacements, and changes can be made without departing from the gist of the invention. These embodiments and the modification thereof are included in the scope of the invention described in the claims and the scope equivalent thereto, as they are included in the scope and gist of the invention.

EXAMPLES

The effect of the method for separating cobalt and nickel according to the present invention was verified.

Procedure of Example of Present Invention 14.5 g of an electrode material taken out from a discarded LIB was added to a processing liquid of 100 mL of sulfuric acid having a concentration of 2 mol/L and 5 mL of hydrogen peroxide water having a concentration of 30% and then heated with stirring at a liquid temperature of 60° C. for 4 hours (the leaching step). Then, cooling was carried out to room temperature, and an aqueous solution of sodium hydrogen sulfide dissolved with stirring in ion exchange water with to 250 g/L was added with stirring to the leachate until the oxidation-reduction potential (ORP) of the leachate was 0 mV (vs Ag/AgCl) or less (the copper separation step).

At this stage, solid-liquid separation was carried out by filtering the carbon of the negative electrode material of the discarded LIB, which was insoluble during the sulfuric acid leaching, and the generated residue (copper sulfide). To the yield according to the method for separating cobalt and nickel according to the present embodiment.

It is noted that the metal concentration was measured by ICP-AES, the pH was measured with a pH meter, and the ORP was measured with an ORP meter. The numerical value of % is based on mass.

(Leaching Step)

Regarding the leaching step of the example of the present invention described above, the leaching rates of cobalt and nickel into the liquid phase were measured with respect to Experimental Examples 1 to 9 in which the concentration of the processing liquid, the liquid amount and the temperature of the hydrogen peroxide water, and the leaching time were changed with each other. The results are shown in Table 1.

TABLE 1

| | Electrode material mass (g) | Sulfuric acid | | Liquid amount of hydrogen peroxide water (mL) | Temperature of processing liquid (° C.) | Leaching time (hr) | Leaching rate (%) | |
| --- | --- | --- | --- | --- | --- | --- | --- | --- |
| | | Liquid amount (mL) | Concentration (mol/L) | | | | Co | Ni |
| Example 1 | 14.5 | 100 | 1 | 10 | 60 | 4 | 76.5 | 73.8 |
| Example 2 | 14.5 | 100 | 1.5 | 10 | 60 | 4 | 85.2 | 82.9 |
| Example 3 | 14.5 | 100 | 2 | 10 | 60 | 4 | 98.7 | 98.2 |
| Example 4 | 14.5 | 100 | 2 | 3 | 60 | 4 | 90.2 | 88.9 |
| Example 5 | 14.5 | 100 | 2 | 5 | 60 | 4 | 98.5 | 98.9 |
| Example 6 | 14.5 | 100 | 2 | 5 | 25 | 4 | 72.5 | 73.6 |
| Example 7 | 14.5 | 100 | 2 | 5 | 40 | 4 | 87.9 | 88.2 |
| Example 8 | 14.5 | 100 | 2 | 5 | 60 | 2 | 78.1 | 79.4 |
| Example 9 | 14.5 | 100 | 2 | 5 | 60 | 3 | 85.6 | 82.6 | eluate obtained here, a sodium hydroxide solution having a concentration of 25 wt % was added to adjust the pH to 3.5, and to this, an aqueous solution of sodium hydrogen sulfide having a concentration of 250 g/L was added with stirring until the ORP became −400 mV (vs Ag/AgCl) or less.

Then, after confirming that black precipitates (cobalt sulfide and nickel sulfide) were sufficiently generated, solid-liquid separation was carried out to recover the precipitates (the cobalt/nickel separation step). On the other hand, impurities such as manganese, aluminum, iron, lithium, and calcium remained in the residual liquid and thus were disposed of as a metal-containing waste liquid.

The precipitates were added to a re-dissolved solution of 100 mL of sulfuric acid having a concentration of 1.5 mol/L and 20 mL of a hydrogen peroxide water having a concentration of 30 wt %, heating was carried out at a liquid temperature of 60° C., and stirring was carried out for 1 hour (the re-dissolving step). Then, after carrying out cooling to room temperature, the undissolved faction and the sulfur single body generated in the reaction in the pre-step were removed by filtration.

From the cobalt-nickel solution obtained in this way, a cobalt sulfate solution and a nickel sulfate solution were separated and recovered with a mixer-settler by using an extractant solution obtained by mixing at a ratio of 20 vol % of PC88A (manufactured by DAIHACHI CHEMICAL INDUSTRY Co., Ltd.) as a metal extractant to 80 vol % of kerosene (the solvent extraction step).

According to the procedure of the example of the present invention, the obtained cobalt was 96.4% and the obtained nickel was 95.3% in terms of yield in the back extract by solvent extraction in a case assuming that the cobalt and the nickel in the electrode material taken out from the discarded LIB were 100%. As a result, it was confirmed that cobalt and nickel can be recovered from the discarded LIB with a high According to the results shown in Table 1, it was confirmed from Experimental Examples 1 to 3 that the concentration of the sulfuric acid in the processing liquid is preferably 2 mol/L or more. Further, from Experimental Examples 3 to 5, it was confirmed that the liquid amount of the hydrogen peroxide water of the processing liquid is preferably 5 mL or more (at a concentration of 30 wt %). In addition, from Experimental Examples 3, 6, and 7, it was confirmed that the temperature (the liquid temperature) of the processing liquid is preferably 60° C. or higher. Further, from Experimental Examples 5, 8, and 9, it was confirmed that the leaching time is preferably 4 hours or more.

(Copper Separation Step)

Next, regarding the copper separation step of the example of the present invention described above, an aqueous solution of sodium hydrogen sulfide was added to the leachate obtained in Experimental Example 5, and the accompanying changes in pH, ORP, and metal concentration in the leachate were investigated. In Experimental Example 10, the leachate before the addition was subjected to measurement. The addition of the aqueous solution of sodium hydrogen sulfide and the measurement were repeated, and the step was considered to be completed when the ORP became 0 mV or less (Experimental Examples 11 to 13). It is noted that the pH measurement was continuously carried out from the start of the addition of the aqueous solution of sodium hydrogen sulfide, and at a stage when the pH was stabilized after each addition, the pH at that time and the elapsed time from the start of the first addition were recorded while measuring other items.

The results are shown in Table 2.

TABLE 2

| | Time | Liquid amount of NaSH aqueous | | ORP | Concentration (g/L) | | | | | |
|---|---|---|---|---|---|---|---|---|---|---|
| | (min) | solution (mL) | pH | (mV) | Ni | Co | Mn | Li | Al | Cu |
| Example 10 | 0 | 0 | 0.79 | 361 | 15.09 | 16.54 | 13.61 | 7.37 | 4.55 | 1.91 |
| Example 11 | 41 | 40 | 0.84 | 266 | 14.73 | 16.08 | 13.34 | 7.22 | 4.48 | 0.3 |
| Example 12 | 59 | 45 | 0.8 | 250 | 14.78 | 16.08 | 13.43 | 7.28 | 4.51 | 0.11 |
| Example 13 | 93 | 54 | 0.83 | −3 | 14.6 | 15.78 | 13.29 | 7.22 | 4.47 | 0 |

The leachate volume is 1.8 L.

According to the results shown in Table 2, it was confirmed that in a case where a hydrogen sulfide compound is added until the ORP is 0 mV or less while maintaining the pH of the leachate at 1.0 or less, almost the entire amount of copper contained in the leachate can be precipitated and subjected to solid-liquid separation from other components such as nickel and cobalt.

(Cobalt/Nickel Separation Step)

Next, regarding the cobalt/nickel separation step of the example of the present invention described above, the influence of the pH of the eluate on the reaction during the addition of the hydrogen sulfide compound was investigated.

[pH 2.0 to 3.0]

In Experimental Example 14, an eluate obtained in Experimental Example 13 was used as the eluate, and the eluate before the addition was measured. Next, an aqueous solution of sodium hydroxide was added to subject a pH-adjusted dissolved solution to measurement (Experimental Example 15). Then, the addition of the aqueous solution of sodium hydrogen sulfide and the measurement were repeated (Experimental Examples 16 to 23). In order to maintain the pH during addition within a range of 2.0 to 3.0, an aqueous solution of sodium hydroxide and sulfuric acid were also added as appropriate together with the aqueous solution of sodium hydrogen sulfide.

Table 3 shows the cumulative adding amounts of various aqueous solutions after the start of the addition of the aqueous solution of sodium hydrogen sulfide, and the liquid amount. pH, ORP, and metal concentration of the dissolved solution at that time.

It is noted that the pH measurement was continuously carried out from the start of the addition of the aqueous solution of sodium hydrogen sulfide, and at a stage when the pH was stabilized after each addition, the pH at that time and the elapsed time from the start of the first addition were recorded while measuring other items.

TABLE 3

| | Time | Cumulative adding amount (mL) | | | Liquid amount of | | ORP | Concentration (g/L) | | |
|---|---|---|---|---|---|---|---|---|---|---|
| | (min) | NaSH | NaOH | H₂SO₄ | eluate (mL) | pH | (mV) | Ni | Co | Mn |
| Example 14 | — | — | — | — | 200 | 0.63 | 467 | 14.01 | 14.06 | 10.22 |
| Example 15 | 0 | 0 | 0 | 0 | 246 | 2.74 | 399 | 14.04 | 14.18 | 10.23 |
| Example 16 | 21 | 11 | 3 | 0 | 260 | 2.33 | −296 | 9.24 | 10.85 | 10.2 |
| Example 17 | 30 | 20 | 5 | 0 | 271 | 2.11 | −319 | 5.4 | 7.86 | 10.34 |
| Example 18 | 50 | 27 | 9 | 0 | 282 | 2.57 | −339 | 2.28 | 5.26 | 10.25 |
| Example 19 | 57 | 33 | 9 | 0 | 288 | 2.15 | −361 | 0.84 | 2.86 | 10.32 |
| Example 20 | 70 | 37 | 10 | 0 | 293 | 2.74 | −381 | 0.24 | 1.11 | 10.22 |
| Example 21 | 80 | 41 | 10 | 0 | 297 | 2.63 | −406 | 0.03 | 0.16 | 10.31 |
| Example 22 | 95 | 43 | 10 | 0 | 299 | 2.86 | −425 | 0 | 0.02 | 10.33 |
| Example 23 | 100 | 45 | 10 | 0.3 | 301.3 | 3 | −429 | 0 | 0.01 | 10.48 |

[pH 2.5 to 3.5]

The aqueous solution addition and the measurement were carried out in the same manner as in Experimental Examples 14 to 23, except that the pH was changed. Experimental Example 24 is for the eluate before addition, Experimental Example 25 is for the dissolved solution after pH adjustment, and Experimental Examples 26 to 33 are for the eluate at each stage of addition. Table 4 shows the measurement results.

TABLE 4

| | Time | Cumulative adding amount (mL) | | | Liquid amount of | | ORP | Concentration (g/L) | | |
|---|---|---|---|---|---|---|---|---|---|---|
| | (min) | NaSH | NaOH | H₂SO₄ | eluate (mL) | pH | (mV) | Ni | Co | Mn |
| Example 24 | — | — | — | — | 200 | 0.89 | 497 | 14.01 | 14.06 | 10.22 |
| Example 25 | 0 | 0 | 0 | 0 | 248 | 3.29 | 339 | 14.92 | 16.22 | 10.21 |
| Example 26 | 10 | 15 | 6 | 0 | 269 | 3.35 | −297 | 7.52 | 11.31 | 10.13 |
| Example 27 | 19 | 25 | 9 | 0 | 282 | 2.86 | −320 | 2.91 | 7.3 | 9.99 |

TABLE 4-continued

| | Time | Cumulative adding amount (mL) | | | Liquid amount of | | ORP | Concentration (g/L) | | |
|---|---|---|---|---|---|---|---|---|---|---|
| | (min) | NaSH | NaOH | H₂SO₄ | eluate (mL) | pH | (mV) | Ni | Co | Mn |
| Example 28 | 26 | 31 | 12 | 0 | 291 | 3.46 | −344 | 0.81 | 4.15 | 9.92 |
| Example 29 | 35 | 34 | 13.5 | 0 | 295.5 | 3.74 | −365 | 0.17 | 2.09 | 9.8 |
| Example 30 | 42 | 36 | 13.5 | 0 | 297.5 | 3.24 | −387 | 0.04 | 0.4 | 10.67 |
| Example 31 | 48 | 37 | 13.5 | 0 | 298.5 | 3.18 | −422 | 0 | 0.03 | 10.51 |
| Example 32 | 55 | 38 | 13.5 | 0 | 299.5 | 3.52 | −453 | 0 | 0 | 10.69 |
| Example 33 | 88 | 39 | 13.5 | 0.3 | 300.8 | 3.34 | −434 | 0 | 0.01 | 10.71 |

According to the results shown in Tables 3 and 4, the addition of the aqueous solution of sodium hydrogen sulfide decreases the nickel concentration and the cobalt concentration while the manganese concentration in the eluate does not change. In a case where the aqueous solution of sodium hydrogen sulfide is added until the ORP reaches −400 mV or less, nickel and cobalt are precipitated as sulfides without manganese being precipitated, and thus nickel and cobalt can be subjected to solid-liquid separation.

[pH 3.5 to 5.0]

The aqueous solution addition and the measurement were carried out in the same manner as in Experimental Examples 14 to 23, except that the pH was changed. Experimental Example 34 is for the dissolved solution after pH adjustment, and Experimental Examples 35 to 38 are for the eluate at each stage of addition. Table 5 shows the measurement results.

TABLE 5

| | Time | Cumulative adding amount (mL) | | | Liquid amount of | | ORP | Concentration (g/L) | | |
|---|---|---|---|---|---|---|---|---|---|---|
| | (min) | NaSH | NaOH | H₂SO₄ | eluate (mL) | pH | (mV) | Ni | Co | Mn |
| Example 34 | 0 | 0 | 0 | 0 | 200 | 3.54 | 300 | 12.29 | 13.21 | 11.01 |
| Example 35 | 89 | 9 | 5 | 0 | 214 | 4.44 | −299 | 6.84 | 9.75 | 10.87 |
| Example 36 | 175 | 21 | 10.4 | 0 | 231.4 | 4.73 | −335 | 1.04 | 4.19 | 10.96 |
| Example 37 | 275 | 26 | 11.6 | 0 | 237.6 | 4.64 | −374 | 0.08 | 0.53 | 11.11 |
| Example 38 | 300 | 28 | 12 | 0 | 240 | 4.96 | −490 | 0 | 0 | 11.17 |

According to the results shown in Table 5, the addition of the aqueous solution of sodium hydrogen sulfide decreases the nickel concentration and the cobalt concentration while the manganese concentration in the eluate is almost constant. In a case where the aqueous solution of sodium hydrogen sulfide is added until the ORP reaches −400 mV, nickel and cobalt are precipitated as sulfides without manganese being precipitated, and thus nickel and cobalt can be subjected to solid-liquid separation.

It is noted that in a pH range of 3.5 to 5.0, it is not easy to control the pH, and after each addition of the aqueous solution of sodium hydrogen sulfide, the time until the pH is stabilized is long as compared with other experimental examples. In addition, in a case where the pH is 3.5 or higher, there is a possibility that a hydroxide having low solubility, other than nickel and cobalt, starts to be generated.

[pH 1.6 to 2.3]

The aqueous solution addition and the measurement were carried out in the same manner as in Experimental Examples 14 to 23, except that the pH was changed. Experimental Example 39 is for the dissolved solution after pH adjustment, and Experimental Examples 40 to 43 are for the eluate at each stage of addition. Table 6 shows the measurement results.

TABLE 6

| | Time | Cumulative adding amount (mL) | | | Liquid amount of | | ORP | Concentration (g/L) | | |
|---|---|---|---|---|---|---|---|---|---|---|
| | (min) | NaSH | NaOH | H₂SO₄ | eluate (mL) | pH | (mV) | Ni | Co | Mn |
| Example 39 | 0 | 0 | 0 | 0 | 200 | 3.6 | 301 | 12.29 | 13.21 | 11.01 |
| Example 40 | 7 | 9 | 0 | 0.8 | 209.8 | 1.78 | −294 | 8.79 | 11.7 | 10.88 |
| Example 41 | 15 | 19 | 0 | 0.8 | 219.8 | 1.64 | −320 | 5.14 | 8.13 | 10.94 |
| Example 42 | 30 | 49 | 0 | 1.4 | 250.5 | 2.04 | −377 | 0.15 | 0.5 | 10.99 |
| Example 43 | 34 | 57 | 0 | 2.8 | 259.8 | 2.22 | −386 | 0.05 | 0.12 | 11.11 |

According to the results shown in Table 6, it can be seen that in a case where the pH of the eluate is not maintained at 2.0 or more and became less than 2.0 even temporarily, a large amount of sodium hydrogen sulfide is required to make cobalt and nickel be sulfides as compared with a case where the pH is maintained at 2.0 or more (Tables 3 to 5). In Experimental Examples 42 and 43 in the stage of the latter half of the test, the pH reaches 2.0 or more. However, in Experimental Examples 40 and 41 in the first half of the test, the pH is less than 2.0, thereby being incapable of effectively being used for the sulfidation of cobalt and nickel and the precipitate generation thereof since sodium hydrogen sulfide reacts with sulfuric acid. Although the aqueous solution of sodium hydrogen sulfide is used mostly in Table 6 as compared to Tables 3, 4, and 5, cobalt and nickel remain in the liquid. In addition, the ORP is also −400 mV or more.

From the above, it was found that in the cobalt/nickel separation step, it is sufficient that the pH of the eluate is maintained within a range of 2.0 to 5.0 and more preferably within a range of 2.0 to 3.5 and the aqueous solution of sodium hydrogen sulfide is added until the ORP is −400 mV or less.

Procedure of Conventional Example

The leaching step and the copper separation step were carried out in the same manner as in the procedure of the example of the present invention to obtain an eluate. Subsequently, instead of the cobalt/nickel separation step, a manganese separation step and an aluminum separation step, which is carried out in the related art, were carried out.

An aqueous solution of sodium hypochlorite having a concentration of 12 wt % was added to the eluate, manganese was subjected to an oxidation treatment to be precipitated as manganese dioxide (MnO₂), and manganese was removed by being subjected to solid-liquid separation with a filtering medium (the manganese separation step).

In this manganese separation step, a part of cobalt and nickel are also trivalently oxidized and precipitated as hydroxides and subjected to solid-liquid separation together with manganese dioxide, which results in a decrease in the yield of cobalt and nickel.

Then, an aqueous solution of sodium hydroxide having a concentration of 25% was added to a filtrate obtained in the manganese separation step to adjust the pH of the filtrate to 5.5, thereby carrying out an operation of separating aluminum as a precipitate of a hydroxide (the aluminum separation step).

In this aluminum separation step as well, a part of cobalt and nickel are precipitated as hydroxides and subjected to solid-liquid separation together with aluminum hydroxide, which results in a further decrease in the yield of cobalt and nickel.

In the procedure of the above-described conventional example, 38.2% of cobalt and 41.3% of nickel are discharged out of the system during the step, assuming that cobalt and nickel in the electrode material taken out from the discarded LIB are 100%, the direct yield remained at 61.8% for cobalt and 58.7% for nickel.

[Manganese Separation Step]

Regarding the manganese separation step of the conventional example described above, an aqueous solution of sodium hypochlorite having a concentration of 5% and an aqueous solution of sodium hydroxide having a concentration of 25% were added to the eluate, and the accompanying change in the metal concentration in the eluate was measured. After subjecting the eluate before addition to the measurement in conventional Experimental Example 1, the addition and the measurement of each aqueous solution were repeated in conventional Experimental Examples 2 to 6. The results are shown in Table 7.

TABLE 7

| | Time | Cumulative adding amount | | Concentration (g/L) | | |
|---|---|---|---|---|---|---|
| | (min) | NaOH (mL) | NaClO (g) | Ni | Co | Mn |
| Conventional Experimental Example 1 | 0 | 0 | 0 | 10.36 | 11.68 | 7.06 |
| Conventional Experimental Example 2 | 20 | 5.6 | 19.2 | 9.89 | 10.79 | 2.99 |
| Conventional Experimental Example 3 | 29 | 7.2 | 25 | 9.89 | 10.57 | 1.7 |
| Conventional Experimental Example 4 | 39 | 8.8 | 30.6 | 9.91 | 10.32 | 0.53 |
| Conventional Experimental Example 5 | 45 | 9.4 | 32.6 | 9.89 | 10.14 | 0.21 |
| Conventional Experimental Example 6 | 51 | 10 | 34.8 | 9.87 | 9.82 | 0.01 |

According to the results shown in Table 7, it was found that as the adding amount of each aqueous solution increases and the precipitation of manganese proceeds, a part of cobalt and nickel are also precipitated, and at most, about 15% of cobalt and nickel are lost in the manganese separation step.

[Aluminum Separation Step]

Next, regarding the aluminum separation step of the conventional example described above, the concentration and the pH of each of metals (cobalt, nickel, manganese, and aluminum) remaining in the filtrate were measured with respect to conventional Experimental Examples 7 to 10 in which the amount of the aqueous solution of sodium hydroxide to be added to the filtrate was changed. Conventional Experimental Example 7 is an example before the addition of the aqueous solution of sodium hydroxide. In Conventional Experimental Example 10, sulfuric acid was also added. The results are shown in Table 8.

TABLE 8

| | Cumulative adding amount (mL) | | | Concentration (g/L) | | | |
|---|---|---|---|---|---|---|---|
| | NaOH | H$_2$SO$_4$ | pH | Ni | Co | Mn | Al |
| Conventional Experimental Example 7 | 0 | 0 | 3.32 | 7.7 | 6.7 | 0.02 | 1.3 |
| Conventional Experimental Example 8 | 3 | 0 | 4.97 | 6.59 | 5.97 | 0.02 | 0.16 |
| Conventional Experimental Example 9 | 5 | 0 | 5.46 | 5.57 | 5.27 | 0.02 | 0.02 |
| Conventional Experimental Example 10 | 6.3 | 0.04 | 5.94 | 4.73 | 4.89 | 0.01 | 0 |

The filtrate volume is 200 mL.

According to the results shown in Table 8, it was found that at a pH of 5.46 (conventional Experimental Example 9), at which almost the entire amount of aluminum is precipitated as a hydroxide, a part of cobalt and nickel are each also precipitated as hydroxides, and as a result. 23% of nickel and 17% of cobalt are lost. In addition, since aluminum hydroxide is in a gel shape, the solid-liquid separation using a filtering medium is difficult.

INDUSTRIAL APPLICABILITY

The method for separating cobalt and nickel according to the present invention makes it possible to accurately separate and recover particularly cobalt and nickel, among the valuable metals contained in a used lithium ion secondary battery, from other metals, whereby a recycled resource having high purity can be efficiently obtained from a lithium ion secondary battery. As a result, the industrial applicability is provided.

What is claimed is:

1. A method for separating cobalt and nickel, in which cobalt and nickel are separated from a lithium ion secondary battery, the method comprising:
a crushing and sorting step of crushing and classifying the lithium ion secondary battery to obtain an electrode material containing at least cobalt, nickel, copper, and lithium;
a leaching step of immersing the electrode material in a processing liquid containing sulfuric acid and hydrogen peroxide to obtain a leachate;
a copper separation step of adding a hydrogen sulfide compound to the leachate with stirring and subsequently carrying out solid-liquid separation to obtain an eluate containing cobalt and nickel and a residue containing copper sulfide; and
a cobalt/nickel separation step of adding an alkali metal hydroxide to the eluate to adjust a pH within a range of 3.0 to 4.0 and subsequently, adding a hydrogen sulfide compound with stirring while maintaining the pH of the eluate within a range of 2.0 to 3.5 from start to end of the addition of the hydrogen sulfide compound and carrying out solid-liquid separation to obtain a precipitate containing cobalt sulfide and nickel sulfide and a residual liquid containing lithium.

2. The method for separating cobalt and nickel according to claim 1, further comprising:
a re-dissolving step of adding, with stirring, a re-dissolved solution containing sulfuric acid to the precipitate separated in the cobalt/nickel separation step and subsequently carrying out solid-liquid separation to obtain a cobalt-nickel solution containing cobalt and nickel; and a solvent extraction step of adding an extractant solution to the cobalt-nickel solution to obtain a cobalt extract and a nickel extract.

3. The method for separating cobalt and nickel according to claim 2,
wherein in the re-dissolving step, an immersion time of the precipitate in the re-dissolved solution is 1 hour or more.

4. The method for separating cobalt and nickel according to claim 2,
wherein in the re-dissolving step, the precipitate is dissolved with a re-dissolved solution containing sulfuric acid and hydrogen peroxide water, or the precipitate is added to the re-dissolved solution containing sulfuric acid and subsequently subjected to air bubbling to dissolve the precipitate.

5. The method for separating cobalt and nickel according to claim 2,
wherein in the re-dissolving step, the re-dissolved solution has a liquid temperature of 60° C. or higher and a sulfuric acid concentration of 0.5 mol/L or more.

6. The method for separating cobalt and nickel according to claim 1,
wherein in the leaching step, the processing liquid has a liquid temperature of 60° C. or higher and a sulfuric acid concentration of 2 mol/L or more.

7. The method for separating cobalt and nickel according to claim 1,
wherein in the copper separation step,
a pH of the leachate is maintained at 1.0 or less from start to end of the addition of the hydrogen sulfide compound, and
an aqueous solution of sodium hydrogen sulfide is added as the hydrogen sulfide compound until an oxidation-reduction potential (vs Ag/AgCl) is 0 mV or less.

8. The method for separating cobalt and nickel according to claim 1,
wherein in the cobalt/nickel separation step,
an aqueous solution of sodium hydrogen sulfide is used as the hydrogen sulfide compound,
and
the hydrogen sulfide compound is added to the eluate until an oxidation-reduction potential (vs Ag/AgCl) is −400 mV or less.

9. The method for separating cobalt and nickel according to claim 1, further comprising, as a pre-step of the crushing and sorting step:
a heat treatment step of heating the lithium ion secondary battery to carry out a heat treatment.

10. A method for separating cobalt and nickel, in which cobalt and nickel are separated from an electrode material containing at least cobalt, nickel, copper, and lithium, the method comprising:
a leaching step of immersing the electrode material in a processing liquid containing sulfuric acid and hydrogen peroxide to obtain a leachate;
a copper separation step of adding a hydrogen sulfide compound to the leachate with stirring and subsequently carrying out solid-liquid separation to obtain an eluate containing cobalt and nickel and a residue containing copper sulfide; and
a cobalt/nickel separation step of adding an alkali metal hydroxide to the eluate to adjust a pH within a range of 3.0 to 4.0 and subsequently, adding a hydrogen sulfide compound with stirring while maintaining the pH of the eluate within a range of 2.0 to 3.5 from start to end of the addition of the hydrogen sulfide compound and carrying out solid-liquid separation to obtain a precipitate containing cobalt sulfide and nickel sulfide and a residual liquid containing lithium.

* * * * *